(12) United States Patent
Pedersen et al.

(10) Patent No.: US 8,054,922 B2
(45) Date of Patent: Nov. 8, 2011

(54) PARAMETER ESTIMATION FOR MODULATED SIGNALS

(75) Inventors: Carsten Aagaard Pedersen, Belmont, MA (US); John Zijun Shen, Winchester, MA (US); Aiguo Yan, Andover, MA (US); Deepak Mathew, Wilmington, MA (US); Marko Kocic, Somerville, MA (US); Timothy Perrin Fisher-Jeffes, Cambridge, MA (US); Thomas Keller, Great Shelford (GB)

(73) Assignee: MediaTek Inc., Hsin-Chu (TW)

( * ) Notice: Subject to any disclaimer, the term of this patent is extended or adjusted under 35 U.S.C. 154(b) by 628 days.

(21) Appl. No.: 12/189,529

(22) Filed: Aug. 11, 2008

(65) Prior Publication Data
US 2009/0161745 A1 Jun. 25, 2009

Related U.S. Application Data

(60) Provisional application No. 61/008,966, filed on Dec. 21, 2007.

(51) Int. Cl.
*H04B 1/10* (2006.01)

(52) U.S. Cl. ...................................... 375/346

(58) Field of Classification Search ............... 375/227, 375/316, 340, 345–346; 455/230, 232.1, 455/234.1
See application file for complete search history.

(56) References Cited

U.S. PATENT DOCUMENTS 6,052,037 A * 4/2000 Kaku et al. .................. 332/100
2009/0161796 A1* 6/2009 Fisher-Jeffes ................ 375/317

FOREIGN PATENT DOCUMENTS

EP 1 855 393 11/2007

OTHER PUBLICATIONS

Parker, "Techniques for the Blind Estimation of Signal to Noise Ratio for Quadrature Modulated Signals," International Symposium on Signal Processing and its Applications, ISSPA, Gold Coast, Australia, Aug. 25-30, 1996, pp. 238-241.

* cited by examiner

*Primary Examiner* — Khanh C Tran
(74) *Attorney, Agent, or Firm* — Fish & Richardson P.C.

(57) ABSTRACT

A system includes a receiver for receiving a modulated signal. The receiver includes a gain estimator for converting complex data representative of constellation points of the modulated signal into scalar data representation. The gain estimator is configured to fold a first portion of the scalar data representation onto a second portion of the scalar data representation. The gain estimator is further configured to estimate a constellation gain value from the folded first portion and the second portion of the scalar data representation.

34 Claims, 10 Drawing Sheets

PARAMETER ESTIMATION FOR MODULATED SIGNALS

CLAIM OF PRIORITY

This application claims priority under 35 USC §119(e) to U.S. Patent Application Ser. No. 61/008,966, filed on Dec. 21, 2007, the entire contents of which are hereby incorporated by reference.

BACKGROUND

This description relates to a system and method for estimating parameters for decoding communication data.

While communication system development continues to progress for achieving higher and higher transmission rates, channel conditions continue to limit system operability. For example, channel noise and other types of conditions may impair data transmission through a communication channel. Consequentially, received channel signals are processed by using a series of reconstruction phases to decode data imbedded in the received signals. By accounting for one or more channel conditions with the reconstruction phases, signals may be demodulated and data decoded for use with one or more applications.

SUMMARY

In general, in one aspect, a method includes converting complex data representative of constellation points of a modulated signal into scalar data representation. A first portion of the scalar data representation is folded onto a second portion of the scalar data representation. The method also includes estimating a constellation gain value from the folded first portion and the second portion of the scalar data representation.

Implementations may include one or more of the following features. Estimating the constellation gain value may include applying a correction factor to the estimated constellation gain value. The method may also include determining an estimated constellation variance from the folded first portion and the second portion of the scalar data representation.

The method may also include removing the estimated constellation gain from the folded first portion and the second portion of the scalar data representation to produce a third portion and a fourth portion of scalar data representation. The third portion may be folded onto the fourth portion of the scalar data representation and a constellation variance may be determined from the folded third portion and the fourth portion of the scalar data representation.

The scalar data representation may represent one or more types of numbers such as real numbers, imaginary numbers, etc. The modulated signal may include one or more types of modulated signals such as Quadrature Phase Shift Keying (QPSK) signals, Quadrature Amplitude Modulation (QAM) signals, etc. Various types mathematical operations may be used folding data representations, for example, folding the first portion of the scalar data representation may include calculating an absolute value of the first portion of the scalar data representation. The correction factor may also depends, at least in part, upon a portion of the scalar data representation exceeding the estimated constellation gain value.

In general, in one aspect, a system includes a receiver for receiving a modulated signal. The receiver includes a gain estimator for converting complex data representative of constellation points of the modulated signal into scalar data representation. The gain estimator is configured to fold a first portion of the scalar data representation onto a second portion of the scalar data representation. The gain estimator is further configured to estimate a constellation gain value from the folded first portion and the second portion of the scalar data representation.

Implementations may include one or more of the following features. The gain estimator may be configured to apply a correction factor to the estimated constellation gain value. The receiver may also include further a variance estimator for determining an estimated constellation variance from the folded first portion and the second portion of the scalar data representation. The variance estimator may remove the estimated constellation gain from the folded first portion and the second portion of the scalar data representation to produce a third portion and a fourth portion of scalar data representation. In such a situation, the variance estimator may fold the third portion onto the fourth portion of the scalar data representation, and determine a constellation variance from the folded third portion and the fourth portion of the scalar data representation.

The scalar data representation may represent one or more types of numbers such as real numbers, imaginary numbers, etc. The modulated signal may include one or more types of modulated signals such as Quadrature Phase Shift Keying (QPSK) signals, Quadrature Amplitude Modulation (QAM) signals, etc. Various types mathematical operations may be used folding data representations, for example, folding the first portion of the scalar data representation may include calculating an absolute value of the first portion of the scalar data representation. The correction factor may also depends, at least in part, upon a portion of the scalar data representation exceeding the estimated constellation gain value.

In general, in one aspect, a computer program product is tangibly embodied in an information carrier and comprises instructions. When the instructions are executed, a processor performs a method that includes converting complex data representative of constellation points of a modulated signal into scalar data representation. The method also includes folding a first portion of the scalar data representation onto a second portion of the scalar data representation. A constellation gain value is estimated from the folded first portion and the second portion of the scalar data representation.

Implementations may include one or more of the following features. Estimating the constellation gain value may include applying a correction factor to the estimated constellation gain value. The method may also include determining an estimated constellation variance from the folded first portion and the second portion of the scalar data representation.

The method may also include removing the estimated constellation gain from the folded first portion and the second portion of the scalar data representation to produce a third portion and a fourth portion of scalar data representation. The third portion may be folded onto the fourth portion of the scalar data representation and a constellation variance may be determined from the folded third portion and the fourth portion of the scalar data representation.

The scalar data representation may represent one or more types of numbers such as real numbers, imaginary numbers, etc. The modulated signal may include one or more types of modulated signals such as Quadrature Phase Shift Keying (QPSK) signals, Quadrature Amplitude Modulation (QAM) signals, etc. Various types mathematical operations may be used folding data representations, for example, folding the first portion of the scalar data representation may include calculating an absolute value of the first portion of the scalar data representation. The correction factor may also depends, at least in part, upon a portion of the scalar data representation exceeding the estimated constellation gain value.

In general, in one aspect, a system includes means for receiving a modulated signal. The receiving means includes means for converting complex data representative of constellation points of the modulated signal into scalar data representation. The means for converting complex data representative of constellation points is configured to fold a first portion of the scalar data representation onto a second portion of the scalar data representation. The means for converting complex data representative of constellation points is further configured to estimate a constellation gain value from the folded first portion and the second portion of the scalar data representation.

Implementations may include one or more of the following features. The means for converting complex data representative of constellation points may be configured to apply a correction factor to the estimated constellation gain value. The means for receiving a modulated signal may include means for determining an estimated constellation variance from the folded first portion and the second portion of the scalar data representation. The means for determining an estimated constellation variance may remove the estimated constellation gain from the folded first portion and the second portion of the scalar data representation to produce a third portion and a fourth portion of scalar data representation. The means for determining an estimated constellation variance may be configured to fold the third portion onto the fourth portion of the scalar data representation, and determine a constellation variance from the folded third portion and the fourth portion of the scalar data representation.

These and other aspects and features and various combinations of them may be expressed as methods, apparatus, systems, means for performing functions, program products, and in other ways.

Other features and advantages will be apparent from the description the claims.

DETAILED DESCRIPTION

Figure 1:
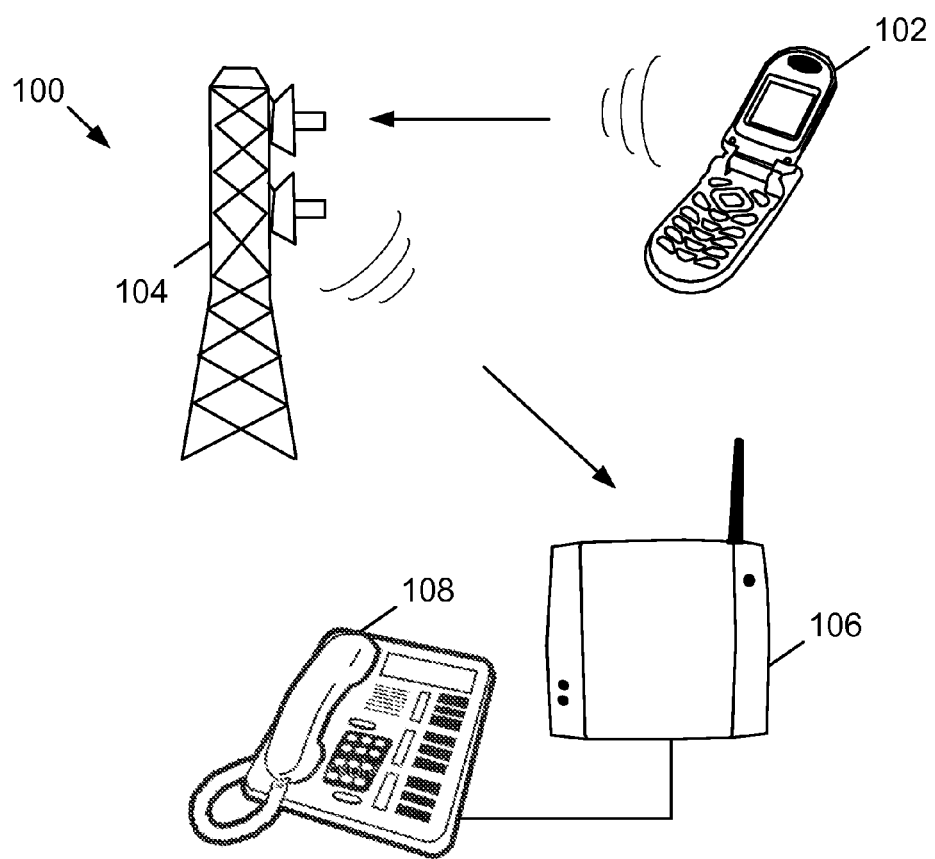
FIG. 1 illustrates a communication system.

Referring to FIG. 1, communication systems such as a cellular system 100 include communication channels that may be impaired by one or more sources such as environmental noise. To reduce the effects of such conditions, modulation, encoding/decoding and processing techniques have been developed to assist data transmission and reception. For example, with the ever increasing demand for higher data transmission rates, standards have been promoted to adopt particular techniques. For example, time division synchronous code division multiple access (TD-SCDMA) standards call for combining time division multiple access (TDMA) with an adaptive, synchronous-mode code division multiple access (CDMA) component. Further, various coding and modulation techniques may be used with TD-SCDMA, for example, Quadrature Phase Shift Keying (QPSK) and quadrature amplitude modulation (QAM) modulation schemes may be implemented for improved channel conditions and signal transmission.

By using such standards and processing techniques, the illustrative communication system 100 may allow efficient information transmission without significant content loss. For example, data (e.g., an audio signal) from a cellular telephone 102 may be transmitted to a cellular network (e.g., represented by a cellular tower 104) and appropriately routed to a fixed cellular terminal 106 for delivery to a telephone 108. In general, the fixed cellular terminal 106 includes the functionality to decode signals from the cellular network and convert the signals into a format recognizable by the telephone 108. Along with the fixed cellular terminal 106, other equipment may also be used for collecting and processing the communication signals, for example, a computing device (e.g., a computer system, personal digital assistant (PDA), etc.) with the appropriate equipment (e.g., modem, wireless connection device such as an air-card, etc.) may be used for connecting to the communication network 100.

Figure 2:
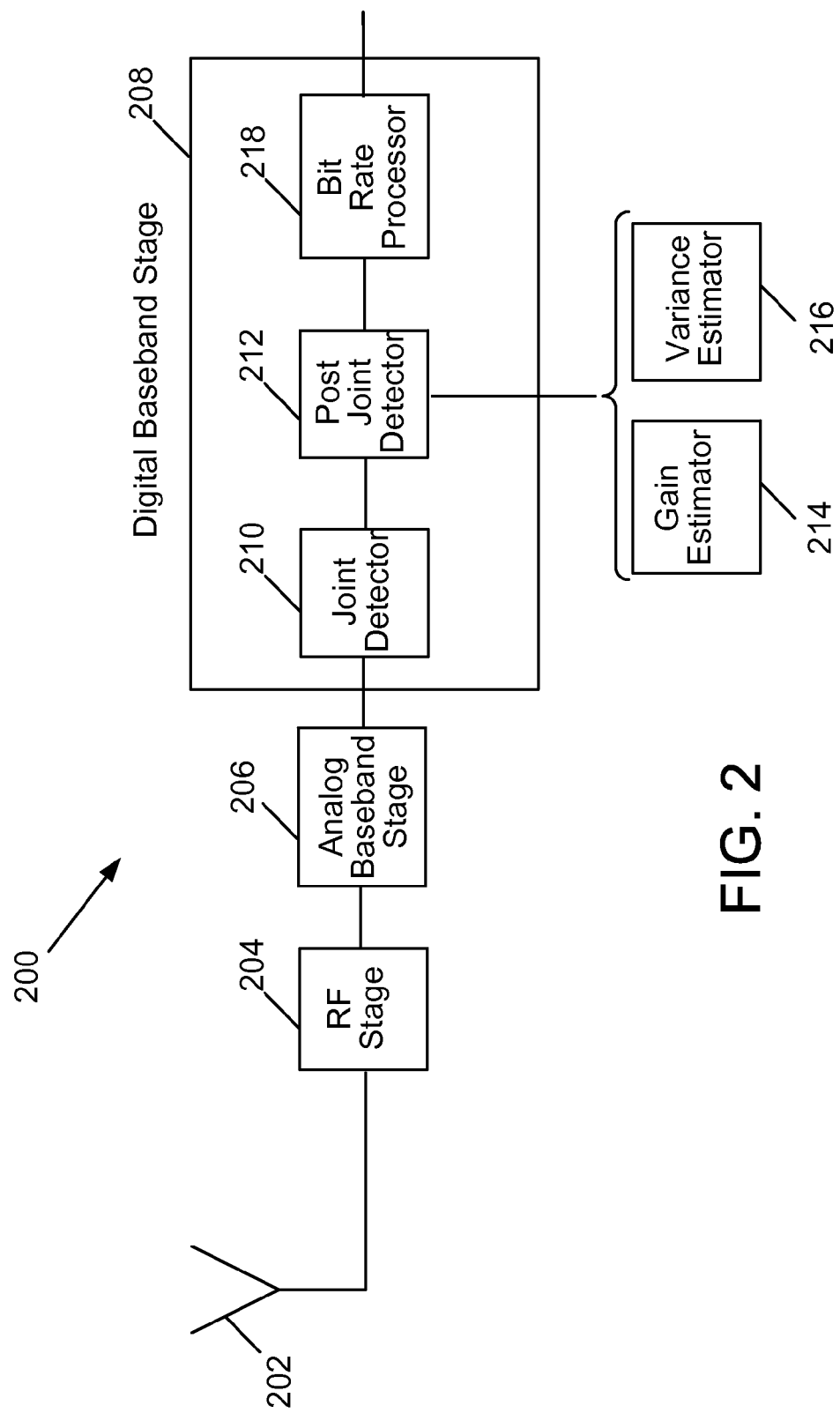
FIG. 2 is a block diagram of a portion of a communication receiver.

Referring to FIG. 2, a block diagram represents a portion of an exemplary receiver 200 of a wireless connection device such as a fixed cellular terminal or an air-card (for use with a computing device). In the illustration, an antenna 202 is capable of transmitting and receiving electromagnetic signals to exchange data with one or more other devices and systems. In regards to signal reception, the receiver 200 includes an radio frequency (RF) stage 204 that processes (e.g., removes carrier signals) the electromagnetic signals received by the antenna 202 and provides a corresponding analog signal to an analog baseband stage 206 for converting into the digital domain. In one implementation, the analog baseband stage 206 includes one or multiple analog-to-digital (A/D) converters for digitizing the signals from the RF stage 204. With the carrier signal removed and the signals digitized, a collection of data channels (referred to as physical channels) is provided to a digital baseband stage 208 that processes (e.g., demodulates, decodes, etc.) the channel data and produces binary data appropriately formatted for the next portion of the receiver 200 (e.g., software application layer).

The digital baseband stage 208 includes a joint detector 210 that detects channels present in the digital data (provided from the analog baseband stage 206). For example, the digital data received by the joint detector 210 may represent a number of channels (e.g., up to sixteen channels) that include various content (e.g., control channels, voice channels, etc.). The joint detector 210 may also detect the physical channel (or channels) present in the digital data. For example, the data received may represent a sum of physical channels, in which each channel includes a segment with an equivalent number of symbols (e.g., forty-four symbols). From the detected sum of physical channels, the joint detector 210 may address a number of types of noise embedded in the digital signal. For example, noise may be introduced by multi-path signals received by the antenna 202, interference associated with the signal content (e.g., inter-code interference), etc. Various operations such as channel equalization along with other techniques and methodologies may be executed by the joint detector 210 for addressing noise issues and signal correction.

The joint detector 210 also extracts individual physical channels. Using the example from above, the input of the joint detector 210 may include a sum the physical channels (e.g., one summed channel with forty-four symbols) and the output may include the extracted individual channels (e.g., sixteen channels, each channel being forty-four symbols in length).

The digital baseband stage 208 includes a post joint detector 212 that performs operations for de-mapping the physical channels and other operations in anticipation of channel decoding such as preparing the physical channels for demodulation. For example, demodulating physical channels that implement QPSK and QAM (e.g., 16-QAM, 64-QAM, etc.) may be assisted by estimating parameters associated with the modulation schemes. In this arrangement, a gain estimator 214 is executed by the post joint detector 212 e.g., for determining the estimated constellation gain for channels that use, for example, QPSK and QAM modulation. Additionally, a variance estimator 216 is executed by the post joint detector 212 e.g., to provide an estimate of signal-and-interference-to-noise-ratio (SINR), for example, to assist with channel demodulation and provide feedback (e.g., to one or more networks) that represents channel quality. While the gain estimator 214 and the variance estimator 216 highlight estimating two parameters for demodulating and decoding (e.g., soft-bit scaling), other operations may also be executed by the post joint detector 212. For example, constellation rotation operations may be executed (by the post joint detector 212 or another portion of the receiver 200) for rotating QPSK or QAM constellations, as needed. In one particular implementation, each constellation may be rotated 45° by the post joint detector 212 to produce constellations with equivalent orientations that are associated with one or more communication standards (e.g., W-CDMA, TD-SCDMA). By adjusting constellation orientation, hardware, software and other portions of the system may be used with wireless standards associated with different constellation arrangements.

The post joint detector 212 also provides the estimated parameters (e.g., constellation gain and variance) for assisting other portions of the receiver 200 (e.g., with demodulating and decoding the channels). For example, the estimated constellation gain and SINR may be provided to a bit rate processor 214 (also included in the digital baseband stage 208) by the post joint detector 212. From the data provided, the bit rate processor 218 demodulates and decodes individual transport channels and may provide additional conditioning prior to passing the decoded binary data to another portion of the receiver 200 (e.g., a software layer).

Figure 3:
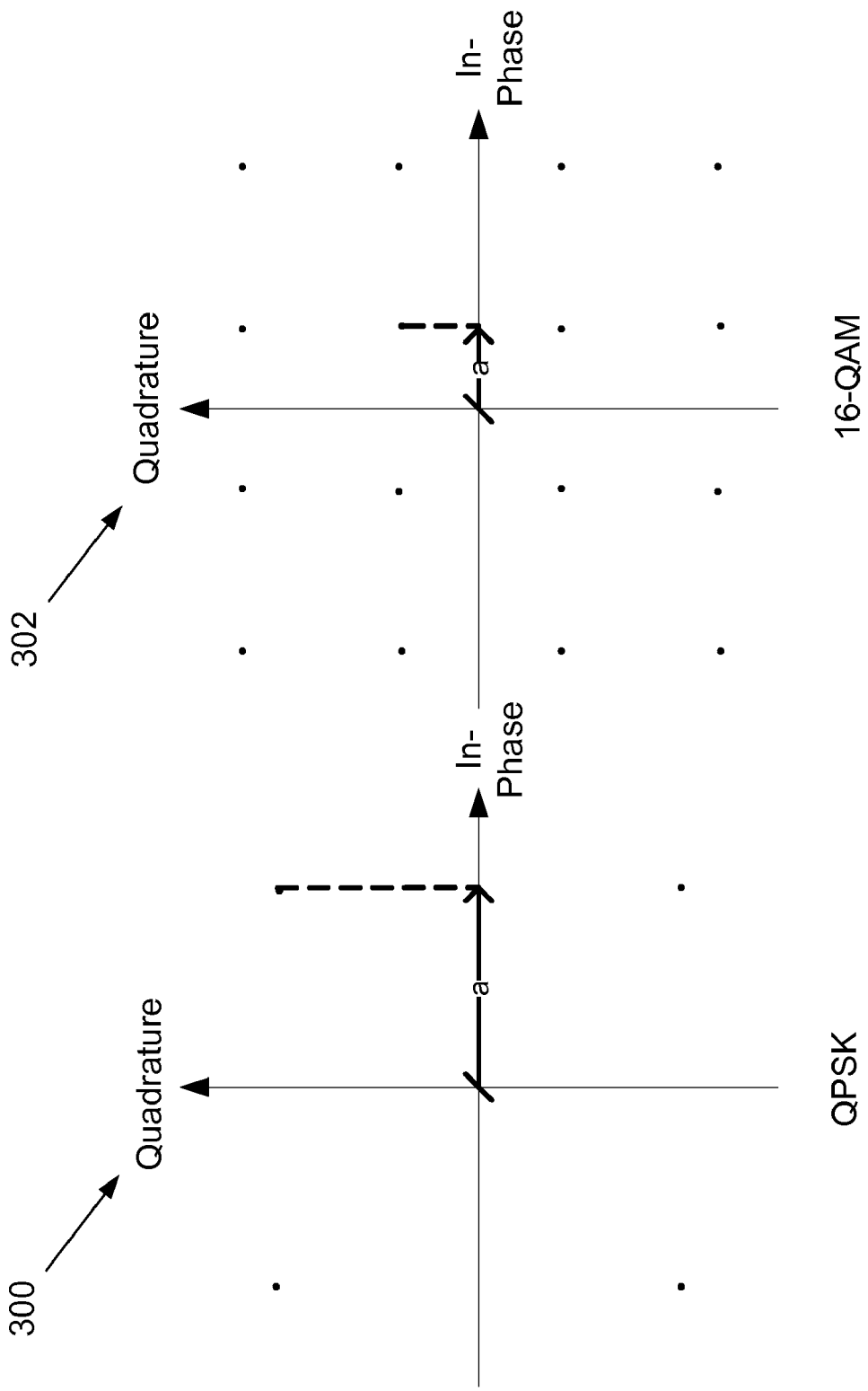
FIG. 3 illustrates constellation diagrams.

Referring to FIG. 3, two diagrams 300, 302 are illustrated that respectively represent constellations of two exemplary modulation techniques that may be used by the system 100 and demodulated by the receiver 200. In particular, constellation diagram 300 represents the signal state space of a QPSK modulated signal and constellation diagram 302 represents the signal state space of a 16-QAM modulated signal. For both diagrams, individual symbols are represented with complex values that include a real part (referred to as the in-phase component) represented on the horizontal axis and an imaginary part (referred to as the quadrature component) represented on the vertical axis. A constellation gain (represented here with the term "a") is also associated with each of the constellation diagrams 300, 302. By quantifying the constellation gain, each constellation point may be identified (along with a corresponding symbol) and the constellation may be constructed for demodulating each channel (using the modulation technique). Further, constellation gain may be used for quantifying other channel parameters. For example, signal power and SINR for each channel may be quantified by using the associated constellation gain. While QPSK and 16-QAM are respectively illustrated with the constellation diagrams 300, 302, variations of these modulations and other modulation techniques may also be implemented.

Referring to FIGS. 4-10, a series of charts illustrate operations of the gain estimator 214 and the variance estimator 216 for respectively estimating constellation gain and variance for QPSK and 16-QAM modulated channel signals. In this implementation, constellation gain "a" is estimated first and used to estimate variance. The technique implemented allows constellation gain to be estimated absent knowledge of the actual symbols being transmitted. As such, processing resources are conserved for other operations such as identifying the sequence symbols being provided by the joint detector 210. In general, constellation gain is determined by folding data sets associated with points of the constellation. For example, by calculating the absolute value of data associated with the constellation points, data sets may be folded upon each other and constellation gain identified by calculating the estimated value (e.g., mean average) of the folded data. For some modulation techniques, other operations may be needed along with folding, for example, one or more correction factors may be applied to estimated values to determine constellation gain. Once determined, the constellation gain may be used in other operations such as calculating a variance estimation (with the variance estimator 216).

Figure 4:
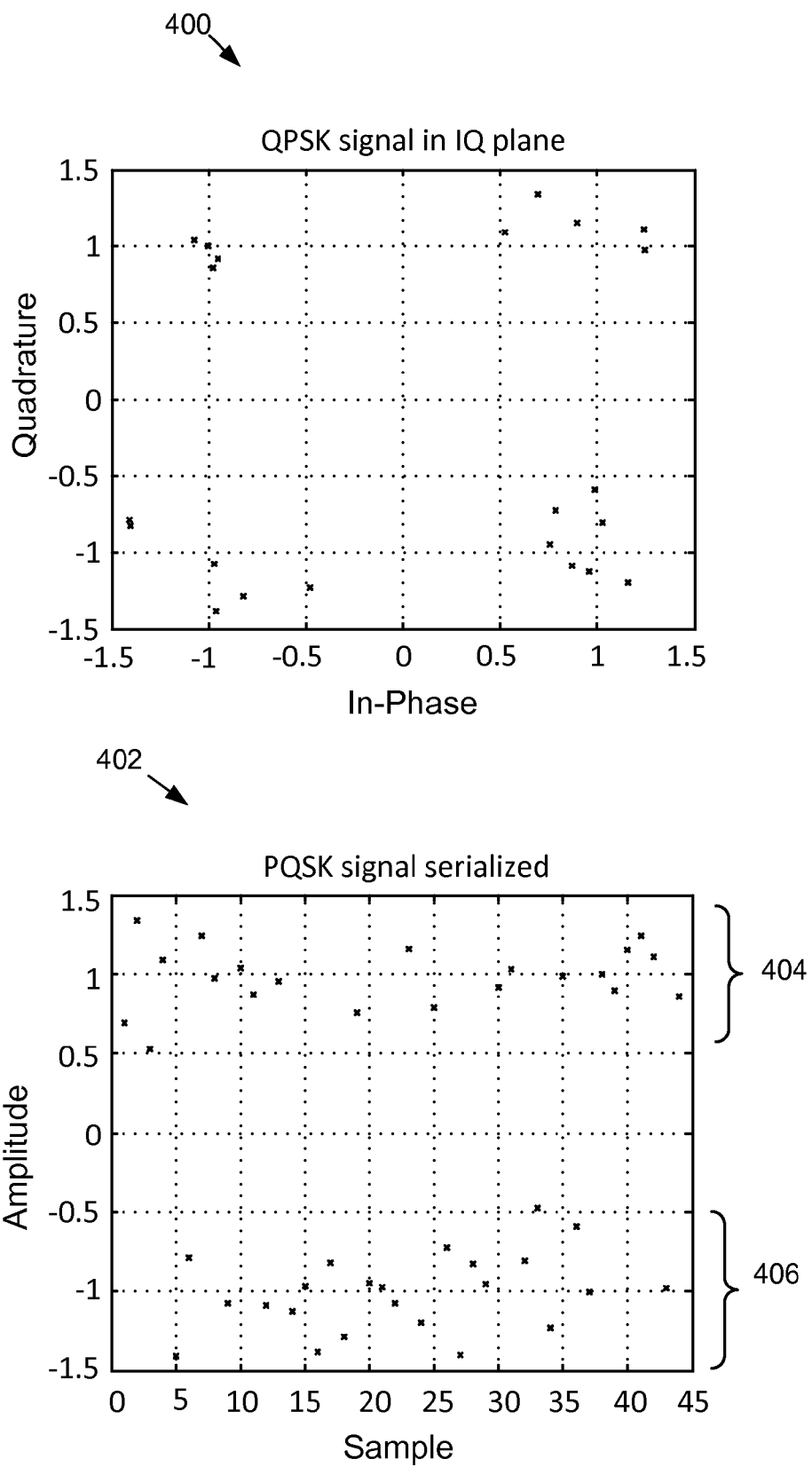
FIG. 4-10 are charts illustrating parameter estimation.

Referring to FIG. 4, a chart 400 illustrates complex data from a QPSK signal represented with in-phase (horizontal axis) and quadrature (vertical axis) components. For the QPSK signal, the four constellation points are centered about component pairs (1, 1), (1, −1), (−1, −1) and (−1, 1). However, due to transmission noise (e.g., multipath signals) and other artifacts (e.g., inter-code interference), data is scattered and does not align with the corresponding constellation point. As such, a consistent constellation gain is not provided from the data distribution and is estimated by the gain estimator 214.

To initiate constellation gain estimation, the gain estimator 214 converts the complex data of the quadrature and in-phase components into a scalar representation. For example, real and imaginary parts of the complex numbers are multiplexed into one sequence of scalar values (e.g., converted to real numbers, converted to imaginary numbers). As illustrated in chart 402, the IQ data is converted into real number values that include one data series 404 with positive values (approximately centered about a value of "a") and another series 406 with negative values (approximately centered about a value of negative "a"). While these two data series 404, 406 use one convention to represent IQ data, other conventions may also be used to serialize IQ data into a real-valued representation.

Figure 5:
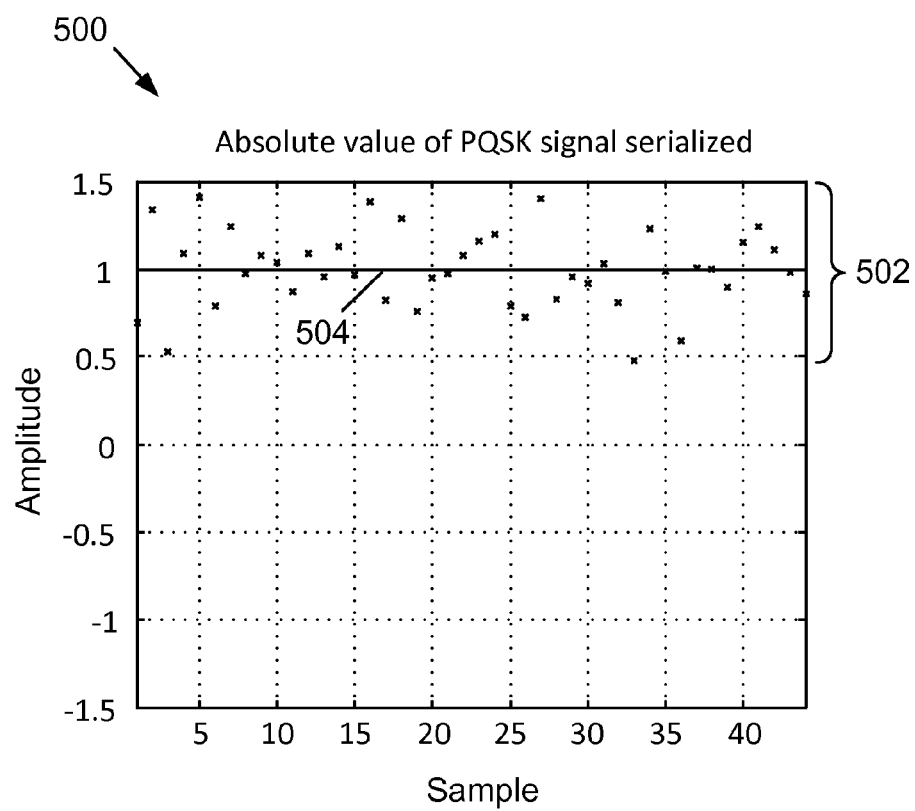

Referring to FIG. 5, a chart 500 illustrates one series of scalar data (e.g., data series 406) being folded onto another data series (e.g., data series 404) for determining the constellation gain (of the QPSK signal). In this implementation, the absolute value is calculated of the data represented in chart 402. As such, the negative values of the data series 406 are folded onto the positive valued data series 404. A data series 502 represents the two data series 404 and 406 upon being folded. By applying the absolute value function, the data series 502 includes data points with positive scalar values and the gain estimator 214 may use one or more techniques to determine the constellation gain. For example, the estimated value (e.g., mean value) of the data series 502 may be calculated by the gain estimator 214, as represented with the bold line 504. As such the constellation gain of the QPSK signal may be represented as:

$$a_{QPSK} = \frac{1}{2N} \sum_{n=0}^{N-1} |\text{re}\{\hat{x}(n)\}| + |\text{im}\{\hat{x}(n)\}| \qquad (1)$$

Other estimation methodologies such as calculating mode values, median values, etc. may also be implemented to identify constellation gain.

Figure 6:
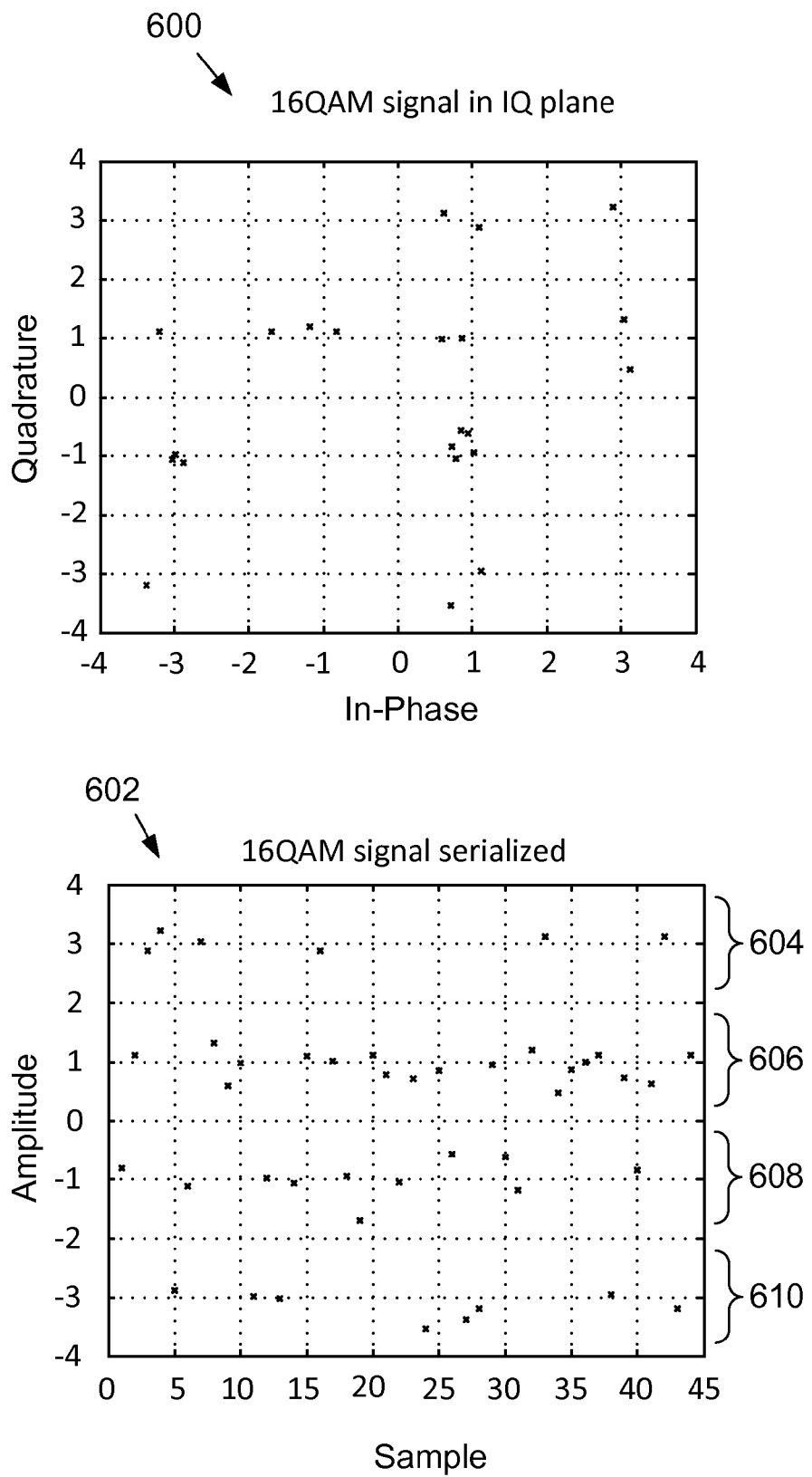

Referring to FIG. 6, folding operations may also be used for estimating constellation gain for other types of modulated signals. For example, constellation gain for 16-QAM signals may be estimated, and similar to the QPSK signal, may be represented as:

$$a'_{16QAM} = \frac{1}{2N}\sum_{n=0}^{N-1} |re\{\hat{x}(n)\}| + |im\{\hat{x}(n)\}| \quad (2)$$

A chart 600 represents data of a 16-QAM signal, with in-phase components represented on the horizontal axis and quadrature components on the vertical axis. Each of the sixteen constellation points are respectively centered at integer values (e.g., –3,3 , –1,1 , etc.), and similar to the QPSK signal, noise and other sources produce data scatter about each constellation point. Also similar to the QPSK signal, the complex IQ data in constellation diagram 600 is converted to a scalar representation (e.g., real values) and is illustrated in a chart 602. Corresponding to the constellation points of the chart 600, the real valued data is centered about values of –3, –1, 1 and 3. As such, rather the two data series respectively centered about values of –1 and 1 (as provided by the QPSK data in chart 402), the 16-QAM serialized data provides four data series 604, 606, 608, 610.

Figure 7:
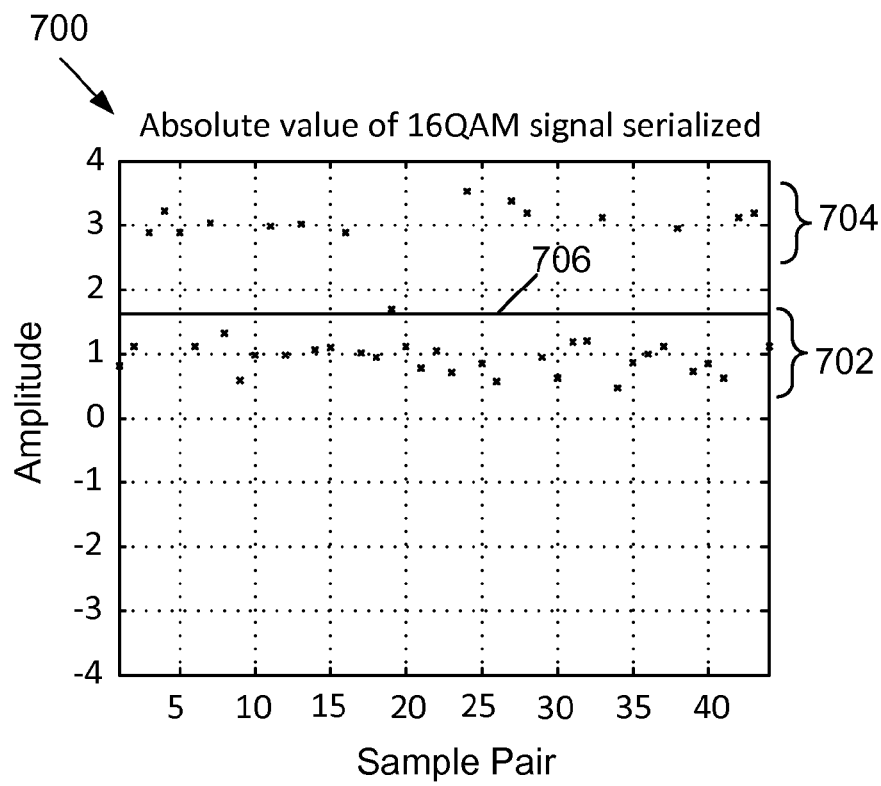

Referring to FIG. 7, similar to processing the QPSK signal data, by folding the scalar 16-QAM signal data, the constellation gain "a" may be quantified. However, since four data series are produced from the 16-QAM signal data (and data series 608 and 610 include negative values), a folding operation by the gain estimator 214 produces two data series (compared to one data series by folding QPSK data). In this example, the folding operations is provided by calculating the absolute value of the 16-QAM data. As illustrated in a chart 700, two data series 702, 704 represent the folded 16-QAM data (respectively centered about positive values 1 and 3). As such, the folding operation does not lead to one data series centered about "a" (e.g., as provided by folding a QPSK signal, as represented with trace 502). Rather two data series 702, 704 are produced, one centered about the constellation gain "a" (e.g., as represented with data series 702) and another centered about three times the constellation gain, "3a", as represented with a trace 704.

In one implementation, the constellation gain may be determined by using the data scattered about both values ("a" and "3a") to calculate and an estimated value (of "2a") and dividing by this value by two. However, the data included in the data series 702 and 704 may not be uniformly distributed about both values of "a" and "3a", thereby producing a bias in the estimated value (as represented with bold trace line 706). To correct such biasing, one or more techniques may be implemented, for example, a correction factor may be calculated and applied to the estimated gain value.

Figure 8:
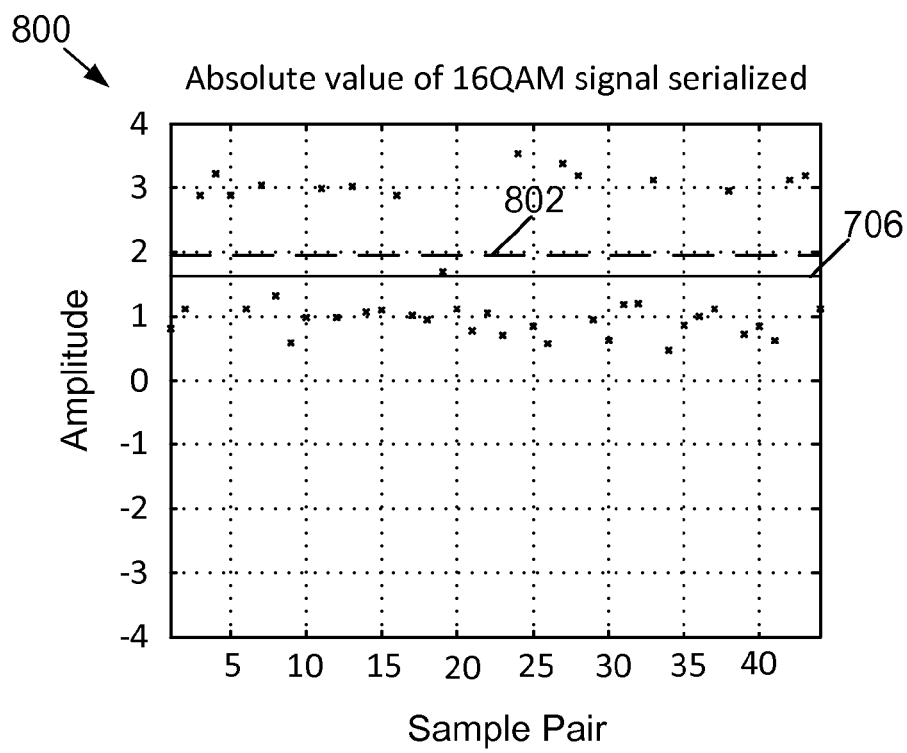

Referring to FIG. 8, a chart 800 illustrates the folded data provided in chart 700 along with the biased gain estimate (represented with the bold trace line 706) calculated from the data. In this example, a correction factor is used to account for the non-uniform distribution of the data series about the values of "a" and "3a". Terms $\gamma_a$ and $\gamma_{3a}$ are respectively defined as the number of data points associated with data series 702 and 704. In this example, the terms $\gamma_a$ and $\gamma_{3a}$ are determined by counting the data points that exceed the estimated constellation gain "2a" and denoting the cardinality of the set C:

$$C=|\{|re\{\hat{x}(n)\}|>a_{16QAM'}\}|+|\{|im\{\hat{x}(n)\}|>a_{16QAM'}\}| \quad (3)$$

As such, the constellation gain is determined from the estimated constellation gain:

$$\begin{aligned}a'_{16QAM} &= a_{16QAM}\gamma_a + 3a_{16QAM}\gamma_{3a} \quad (4)\\ &= a_{16QAM}(1-\gamma_a) + 3a_{16QAM}\gamma_{3a}\\ &= a_{16QAM}\left(1-\frac{C}{2N}\right) + 3a_{16QAM}\frac{C}{2N}\end{aligned}$$

$$a_{16QAM} = a'_{16QAM}\frac{N}{N+C}$$

Thus, for "N" number of data points, the number of data points that exceed the biased constellation gain estimate (represented by bold trace line 706) are counted and assigned the value "C". A correction factor, N/(N+C), is calculated from the quantities and may be applied to the estimated constellation gain to correct the bias. As represented with a bold dashed line 802, the corrected estimation value provides an improved approximation compared to the bias estimation value. In this example, the estimated constellation gain (bias and corrected) is associated with a value of "2a" (since the estimate is calculated from data distributed among values of "a" and "3a"). As such, once the correction factor is applied to estimated constellation gain, the resulting quantity (represented by line 802) is divided by a value of two to produce the estimated corrected constellation gain "a".

Figure 9:
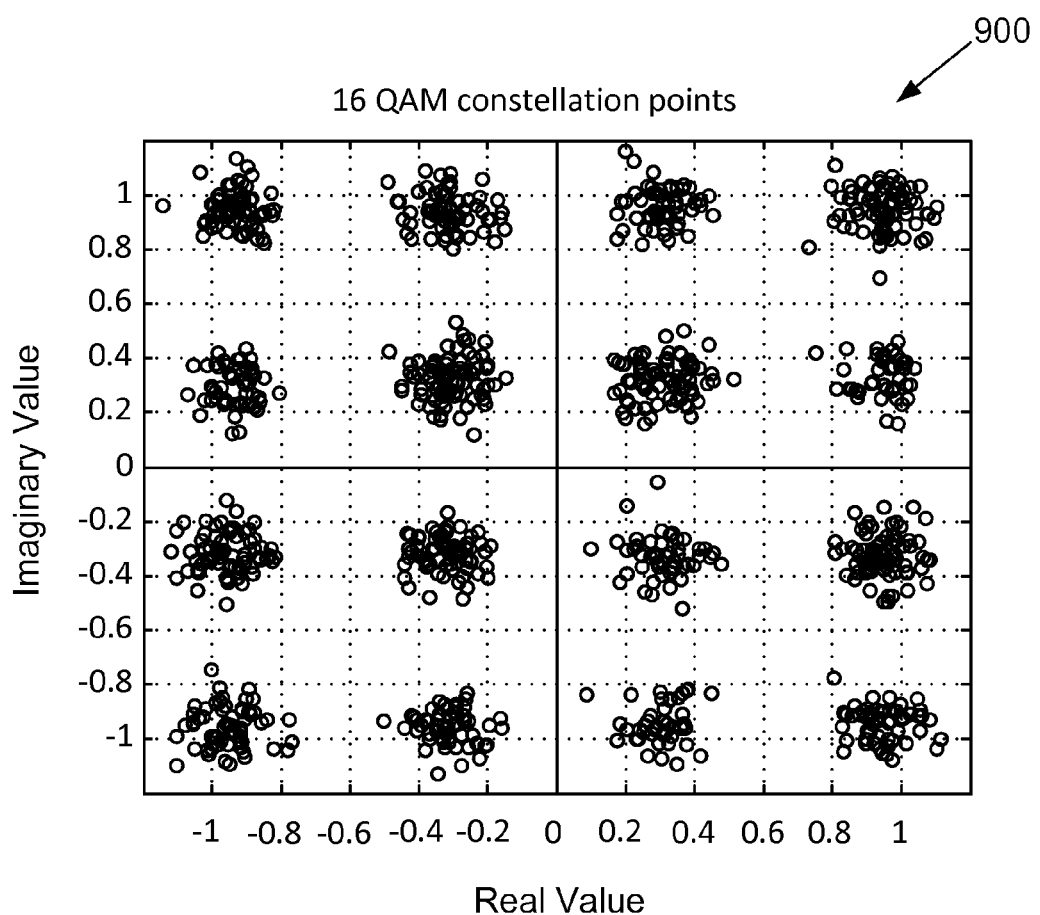

Referring to FIG. 9, the estimated constellation gain provided by the gain estimator 214, corrected for bias or not, can be used by the variance estimator 216 to estimate the variance of the constellation points. For example, a chart 900 illustrates received data associated with sixteen constellation points of a 16-QAM signal. As illustrated in the chart 900, data is scatter about each constellation point. By quantifying the variance, interference and noise estimations may be calculated, for example, SINR may be calculated for demodulation or other types of operations (e.g., defining and applying weights). Similar to the gain estimator 214, the variance estimator 216 may also calculate variance for other types of modulated signals such as QPSK signals.

One or more techniques and methodologies may be implemented to estimate variance. For example, the Euclidean distance between constellation points, as expressed by the constellation gain "a", may be used by the variance estimator 216 for variance estimations. A constellation (e.g., QPSK constellation, 16-QAM constellation, etc.) may be folded such that, for example, all of the constellation points map to a scalar representation. One or more variance calculating techniques may then be used to quantify the data spread about the scalar representation. In one arrangement, absolute value and mean subtraction operations may be repeatedly executed for folding constellation points and mapping to a single value in preparation of variance calculations.

Figure 10:
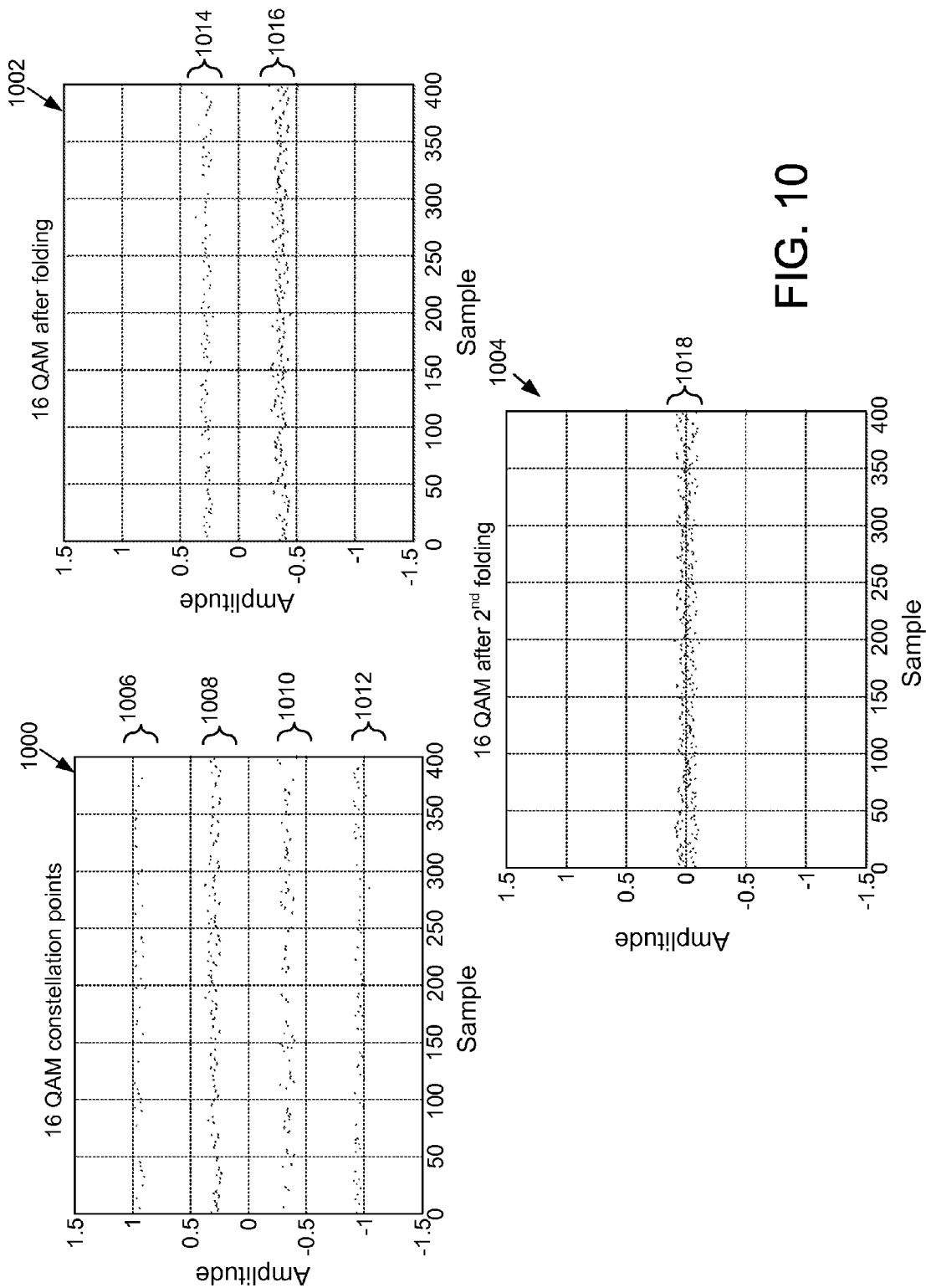

Referring to FIG. 10, a series of charts 1000, 1002, 1004 represent the repetitive use of folding and estimate value subtraction for variance estimation. The chart 1000 illustrates complex 16-QAM constellation data in which the real and imaginary components are converted, for example, to represent real scalar values (as respectively provided by data sets 1006, 1008, 1010, 1012). To fold the data sets, in this example, the absolute value of the data is calculated (thereby folding negative values of data sets 1010 and 1012 onto the corresponding positive value data sets 1006 and 1008). Additionally, the estimated value of the folded data (e.g., mean value) is calculated, typically as a function of constellation gain "a". As illustrated in chart 1002, the estimated value is subtracted (after folding the data) to provide a zero estimate value of data sets 1014 and 1016. By applying another folding operation (e.g., absolute value calculation) to the data represented in chart 1002, the data set 1016 is folded onto data set 1014. Again, the estimated value (e.g., mean value) is calculated and subtracted from the folded data to produce data set 1018 as illustrated by chart 1004. One or more variance calculation techniques and methodologies may be implemented by the variance estimator 216 to compute the variance of the zero-mean data set 1018.

As illustrated with charts 1000-1004, two instances of folding and estimated value subtraction operations may be executed to prepare the constellation data for a variance estimation. In some arrangements, additional or less operation instances may be needed. For example, for QAM signals with additional constellation points (e.g., 32 points, 64 points, etc.), additional folding and mean-value subtraction operation repetitions are needed for variance estimations. In another example, for a QPSK signal, one instance of folding and estimated value subtraction is needed for the four constellation point data to be prepared for variance estimation.

Upon estimating the constellation gain (e.g., with the gain estimator 214) and variance (e.g., with the variance estimator 216), one or more quantities may be calculated from the information. For example, the power of received signal may be determined from the constellation gain. For a QPSK signal, the power may be represented as:

$$P = \frac{4 \cdot (a^2 + a^2)}{4} = 2a^2 \quad (5)$$

and the power of a 16-QAM signal may be represented as:

$$P = \frac{4 \cdot (a^2 + a^2) + 4 \cdot ((3a)^2 + (3a)^2) + 8 \cdot (a^2 + (3a)^2)}{16} = 10a^2 \quad (6)$$

Figure 11:
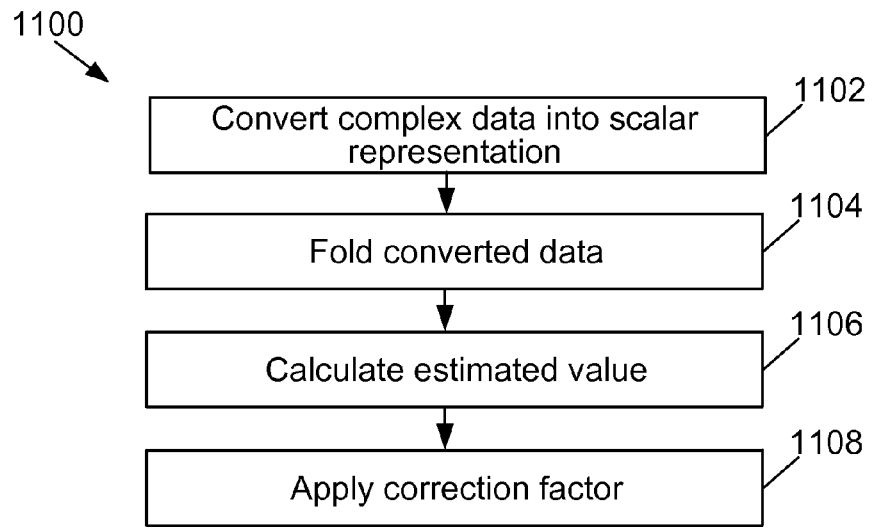
FIG. 11 is a flowchart of operations of a gain estimator.

Referring to FIG. 11, a flowchart 1100 represents some of the operations of the gain estimator 214. As mentioned above, the gain estimator 214 may be executed by a post joint detector such as the post joint detector 212 included in the receiver 200. Along with post joint detector 212, operations of the gain estimator 214 may be executed by one or more other portions of the receiver 200. Circuitry (e.g., digital logic) and computing devices (e.g., a computer system) may also be used individually or in combination to execute the operations of the gain estimator 214. For example, in a processor based receiver design, instructions may be executed by a processor (e.g., a microprocessor) to provide the operations. Such instructions may be stored in a storage device (e.g., hard drive, CD-ROM, etc.) and provided to the processor (or multiple processors) for execution.

Operations of the gain estimator 214 may include converting 1102 complex IQ constellation data into a scalar representation. For example complex data that represents the in-phase and quadrature components of a QPSK or 16-QAM signals may be converted to be represented as real values (or imaginary values). Operations of the gain estimator also include folding 1104 the converted data. For example, the absolute value of the converted data may be calculated to fold the negative data values onto counterpart positive data values. Once folded, the estimated value of the folded data may be calculated 1106 by the gain estimator. For example, the mean value, or other type of estimated value (e.g., mode value, median value, etc.) may be calculated from the folded data. In some arrangements, the gain estimator 214 may include optional operations, dependent upon the modulation scheme implemented. For example, operations may include applying 1108 a correction factor to the estimated value. For a 16-QAM signal, along with applying a correction factor to account for data distribution bias, other factors may be applied. For example, a one-half factor (i.e., ½) may be applied to the corrected estimated value to account for constellation point values.

Figure 12:
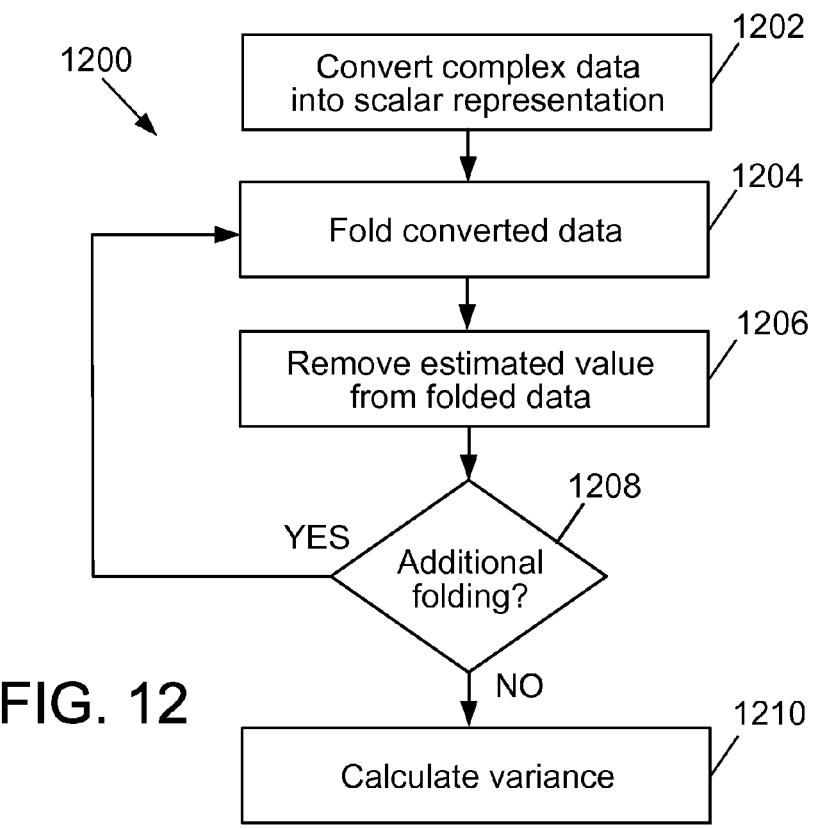
FIG. 12 is a flowchart of operations of a variance estimator.

Referring to FIG. 12, a flowchart 1200 represents some of the operations of the variance estimator 216. As mentioned above, the variance estimator 216 may be executed by a post joint detector such as the post joint detector 212 included in the receiver 200. Along with post joint detector 212, operations of the variance estimator 214 may be executed by one or more other portions of the receiver 200. Circuitry (e.g., digital logic) and computing devices (e.g., a computer system) may also be used individually or in combination to execute the operations of the variance estimator 216. For example, in a processor based receiver design, instructions may be executed by a processor (e.g., a microprocessor) to provide the operations. Such instructions may be stored in a storage device (e.g., hard drive, CD-ROM, etc.) and provided to the processor (or multiple processors) for execution. To improve processing efficiency, execution of operations (or portions of operations) common to the gain estimator 214 and the variance estimator 216 may be shared. Along with processing ability, resources such as memory may also be shared between the gain estimator 214, the variance estimator 216 and other associated processes.

Similar to the gain estimator 214, operations of the variance estimator 216 may include converting 1202 complex data into a scalar representation. For example complex data that represents the in-phase and quadrature components of a QPSK or 16-QAM signals may be converted to be represented as real values (or imaginary values). As mentioned above, operations include folding 1204 the converted data and removing 1206 the estimated value of the folded data. For modulation schemes such as 16-QAM, a second series of folding and estimated value removing operations may be needed to produce data with an estimated value of zero. As such, operations include determining 1208 if additional folding is needed. If needed, operations return for another set of folding and removing the estimated value (e.g., mean value). If additional folding and estimated value removing operations are not needed, the variance estimator 216 calculates 1210 the variance of the zero estimated value data.

As mentioned above, in some receiver designs may be processor based. As such to perform the operations described in the flow charts 1100 and 1200, the gain estimator 214 and the variance estimator 216, individually or in combination, may perform any of the computer-implement methods described previously, according to one implementation. For example, the receiver 200 may include a computing device (e.g., a computer system) for executing instructions associated with the gain estimator 214 and the variance estimator 216. The computing device may include a processor, a memory, a storage device, and an input/output device. Each of the components may be interconnected using a system bus or other similar structure. The processor may be capable of processing instructions for execution within the computing device. In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the computing device. In one implementation, the memory is a computer-readable medium. In one implementation, the memory is a volatile memory unit. In another implementation, the memory is a non-volatile memory unit.

The storage device is capable of providing mass storage for the computing device. In one implementation, the storage device is a computer-readable medium. In various different implementations, the storage device may be a floppy disk device, a hard disk device, an optical disk device, or a tape device.

The input/output device provides input/output operations for the computing device. In one implementation, the input/output device includes a keyboard and/or pointing device. In another implementation, the input/output device includes a display unit for displaying graphical user interfaces.

The features described (e.g., the gain estimator 214 and the variance estimator 216) can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Other embodiments are within the scope of the following claims. The techniques described herein can be performed in a different order and still achieve desirable results.

What is claimed is:

1. A method comprising:
    converting complex data representative of constellation points of a modulated signal into scalar data representation;
    folding a first portion of the scalar data representation onto a second portion of the scalar data representation; and
    estimating a constellation gain value from the folded first portion and the second portion of the scalar data representation.

2. The method of claim 1, wherein estimating the constellation gain value includes applying a correction factor to the estimated constellation gain value.

3. The method of claim 1, further comprising:
    determining an estimated constellation variance from the folded first portion and the second portion of the scalar data representation.

4. The method of claim 1, further comprising:
    removing the estimated constellation gain from the folded first portion and the second portion of the scalar data representation to produce a third portion and a fourth portion of scalar data representation; folding the third portion onto the fourth portion of the scalar data representation; and determining a constellation variance from the folded third portion and the fourth portion of the scalar data representation.

5. The method of claim 1, wherein the scalar data representation represents real numbers.

6. The method of claim 1, wherein the scalar data representation represents imaginary numbers.

7. The method of claim 1, wherein the modulated signal is a Quadrature Phase Shift Keying (QPSK) signal.

8. The method of claim 1, wherein the modulated signal is a Quadrature Amplitude Modulation (QAM) signal.

9. The method of claim 1, wherein folding the first portion of the scalar data representation includes calculating an absolute value of the first portion of the scalar data representation.

10. The method of claim 2, wherein the correction factor depends, at least in part, upon a portion of the scalar data representation exceeding the estimated constellation gain value.

11. A system comprising:
    a receiver for receiving a modulated signal, the receiver including, a gain estimator for converting complex data representative of constellation points of the modulated signal into scalar data representation, the gain estimator is configured to fold a first portion of the scalar data representation onto a second portion of the scalar data representation, the gain estimator is further configured to estimate a constellation gain value from the folded first portion and the second portion of the scalar data representation.

12. The system of claim 11, wherein the gain estimator is configured to apply a correction factor to the estimated constellation gain value.

13. The system of claim 11, wherein the receiver further comprises:
a variance estimator for determining an estimated constellation variance from the folded first portion and the second portion of the scalar data representation.

14. The system of claim 13, wherein the variance estimator removes the estimated constellation gain from the folded first portion and the second portion of the scalar data representation to produce a third portion and a fourth portion of scalar data representation, the variance estimator is configured to fold the third portion onto the fourth portion of the scalar data representation, the variance estimator is further configured to determine a constellation variance from the folded third portion and the fourth portion of the scalar data representation.

15. The system of claim 11, wherein the scalar data representation represents real numbers.

16. The system of claim 11, wherein the scalar data representation represents imaginary numbers.

17. The system of claim 11, wherein the modulated signal is a Quadrature Phase Shift Keying (QPSK) signal.

18. The system of claim 11, wherein the modulated signal is a Quadrature Amplitude Modulation (QAM) signal.

19. The system of claim 11, wherein the gain estimator calculates an absolute value of the first portion of the scalar data representation to fold the first portion of the scalar data representation.

20. The system of claim 12, wherein the correction factor depends, at least in part, upon a portion of the scalar data representation exceeding the estimated constellation gain value.

21. A non-transitory storage device having computer instructions that when executed by a processor perform a method comprising:
converting complex data representative of constellation points of a modulated signal into scalar data representation;
folding a first portion of the scalar data representation onto a second portion of the scalar data representation; and
estimating a constellation gain value from the folded first portion and the second portion of the scalar data representation.

22. The storage device of claim 21, wherein estimating the constellation gain value includes applying a correction factor to the estimated constellation gain value.

23. The storage device of claim 21, wherein the method further comprises:
determining an estimated constellation variance from the folded first portion and the second portion of the scalar data representation.

24. The storage device of claim 21, wherein the method further comprises:
removing the estimated constellation gain from the folded first portion and the second portion of the scalar data representation to produce a third portion and a fourth portion of scalar data representation;
folding the third portion onto the fourth portion of the scalar data representation; and
determining a constellation variance from the folded third portion and the fourth portion of the scalar data representation.

25. The storage device of claim 21, wherein the scalar data representation represents real numbers.

26. The storage device of claim 21, wherein the scalar data representation represents imaginary numbers.

27. The storage device of claim 21, wherein the modulated signal is a Quadrature Phase Shift Keying (QPSK) signal.

28. The storage device of claim 21, wherein the modulated signal is a Quadrature Amplitude Modulation (QAM) signal.

29. The storage device of claim 21, wherein folding the first portion of the scalar data representation includes calculating an absolute value of the first portion of the scalar data representation.

30. The storage device of claim 22, wherein the correction factor depends, at least in part, upon a portion of the scalar data representation exceeding the estimated constellation gain value.

31. A system comprising:
means for receiving a modulated signal, including,
means for converting complex data representative of constellation points of the modulated signal into scalar data representation, the means for converting complex data representative of constellation points is configured to fold a first portion of the scalar data representation onto a second portion of the scalar data representation, the means for converting complex data representative of constellation points is further configured to estimate a constellation gain value from the folded first portion and the second portion of the scalar data representation.

32. The system of claim 31, wherein the means for converting complex data representative of constellation points is configured to apply a correction factor to the estimated constellation gain value.

33. The system of claim 31, wherein the means for receiving a modulated signal further comprises:
means for determining an estimated constellation variance from the folded first portion and the second portion of the scalar data representation.

34. The system of claim 33, wherein the means for determining an estimated constellation variance removes the estimated constellation gain from the folded first portion and the second portion of the scalar data representation to produce a third portion and a fourth portion of scalar data representation, the means for determining an estimated constellation variance is configured to fold the third portion onto the fourth portion of the scalar data representation, and determine a constellation variance from the folded third portion and the fourth portion of the scalar data representation.

* * * * *